No. 756,153. PATENTED MAR. 29, 1904.
G. S. BOYD.
AUTOMATIC CORN PLANTER AND MARKER.
APPLICATION FILED JULY 25, 1902.
NO MODEL.
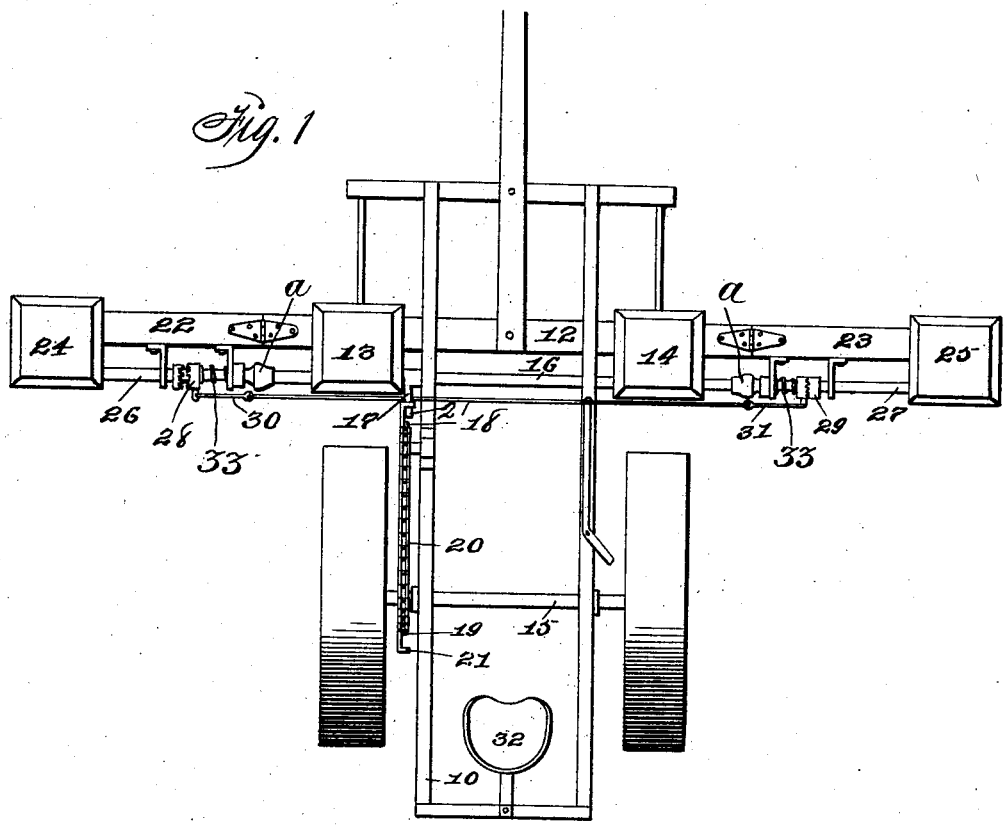
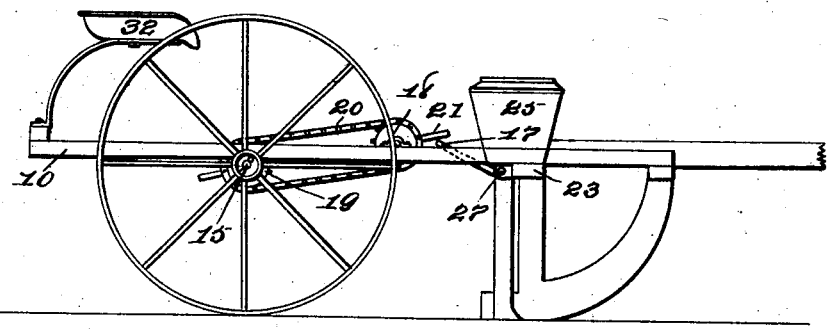
Witnesses: Inventor: Gaston S. Boyd.
R. C. Orwig. By Thomas G. Orwig, Attorney.
Henry Manger.
THE NORRIS PETERS CO., PHOTO-LITHO., WASHINGTON, D. C.

No. 756,153. Patented March 29, 1904.

UNITED STATES PATENT OFFICE.

GASTON S. BOYD, OF RUSSELL, IOWA, ASSIGNOR OF ONE-THIRD TO HERBERT S. BOYD, OF RUSSELL, IOWA.

AUTOMATIC CORN-PLANTER AND MARKER.

SPECIFICATION forming part of Letters Patent No. 756,153, dated March 29, 1904.

Application filed July 25, 1902. Serial No. 117,010. (No model.)

*To all whom it may concern:*

Be it known that I, GASTON S. BOYD, a citizen of the United States, residing at Russell, in the county of Lucas and State of Iowa, have invented a new and useful Automatic Corn-Planter and Marker, of which the following is a specification.

My object is to dispense with knotted wires and machinery heretofore used in combination with automatic corn-planters for producing check-rows and also to dispense with the use of markers that contact with the ground to produce continuous furrows or marks at intervals of space in parallel lines with the line of advance when the planter is in operation.

My invention consists in the arrangement and combination of mechanism with a corn-planter for dropping corn, salt, lime, gypsum, or other matter on the top of the ground in a line parallel with the line of advance, so that it will be plainly visible on a return trip across the field and will be adapted to serve as a mark to govern the direction of the planter to simultaneously plant parallel rows equidistant apart, as required to produce check-rows, and I accomplish the results contemplated by the mechanism attached to a corn-planter, as hereinafter set forth, pointed out in my claims, and illustrated in the accompanying drawings, in which—

Figure 1 is a top view of a planter and shows the positions of all the parts of my invention relative to each other and the carriage and seedboxes. Fig. 2 is a side elevation of the planter and one of the marker attachments in position as required for dropping marking material at the same time seed is dropped in two parallel rows as the planter is advanced across a field.

The numeral 10 designates the carriage-frame of a corn-planter, and 12 is the cross bar or bench at the rear end of the runner-frame, upon which the seedboxes 13 and 14 are mounted.

The carriage-wheels are fixed to the rotatable carriage-axle 15, and 16 is a rock-shaft in parallel position with the bench 12 and has a fixed arm 17, adapted for imparting intermittent motions to the shaft, as required for communicating motion at regular intervals of time to seed-dropping valves (not shown) in the bottoms of the seedboxes.

A sprocket-wheel 18 is supported on a bearer fixed to the carriage-frame, and 19 is a sprocket-wheel fixed to the axle 15. A chain 20, placed on these wheels, has one or more links provided with integral fingers 21, adapted to engage the arm 17 on the shaft 16, as required to rock the shaft at regular intervals of time and space, as required for actuating seed-dropping valves in the seedboxes.

Extensions 26 and 27, provided with universal joints *a*, are also connected with the ends of the rock-shaft 16 by means of clutches 28 and 29 in such a manner that they can be alternately disconnected from the rock-shaft as required to coact therewith alternately as the planter is advanced back and forth in parallel lines across a field. Levers 30 and 31 are connected with the clutches as required for alternately connecting and disconnecting the rock-shaft 16. A seat 32 is on the rear end of the frame. Springs 33 on the shaft normally retain the clutches 28 and 29 in engagement.

In practical operation one of the rock-shaft extensions is disconnected from the shaft 16 by means of the clutch and folded inward with the parallel hinged bench extension that supports the seedbox to be carried inoperative while the other hinged extension of the bench remains extended to carry the rock-shaft extension in an operative position.

Having thus described the purpose, construction, application, and operation of my marking attachment for corn-planters, the practical utility of the invention will be readily understood by persons familiar with the art to which it pertains, and

What I claim as new, and desire to secure by Letters Patent, is—

1. In a corn-planter, a rock-shaft having extensions detachably connected with its ends by universal joints, a cam fixed to the shaft, clutches for operating the shaft extensions with the rock-shaft, seedbox-supports hinged to the sides of the carriage-frame and seedboxes fixed on the ends of the supports, arranged and combined to operate in the manner set forth for the purposes stated.

2. In a corn-planter, a rock-shaft having extensions connected with its ends by universal joints, a cam fixed to the shaft, clutches for connecting the shaft extensions with the rock-shaft, seedbox-supports hinged to the sides of the carriage-frame and seedboxes fixed on the ends of the supports, and means for normally retaining the rock-shaft in position to project the fixed cam rearward, arranged and combined to operate in the manner set forth for the purposes stated.

3. An attachment for corn-planters comprising a rock-shaft, a fixed cam at its central portion and extensions connected by universal joints, clutches for operating the extensions with the rock-shaft, levers for operating the clutches, a sprocket-wheel mounted on the carriage-frame, a sprocket-wheel on the rotatable carriage-axle, a chain on said sprocket-wheel having fingers projecting from links to engage the fixed cam on the rock-shaft, seedbox-supports hinged to the sides of the carriage-frame, seedboxes on the ends of the hinged supports, and means for normally retaining the rock-shaft to extend the fixed cam thereon rearward, arranged and combined to operate in the manner set forth for the purposes stated.

GASTON S. BOYD.

Witnesses:
W. M. LARIMER,
C. B. THOMPSON.